No. 781,862. PATENTED FEB. 7, 1905.
H. A. ALLEN.
EXPANSION JOINT FOR FLUID PIPES.
APPLICATION FILED APR. 4, 1904.
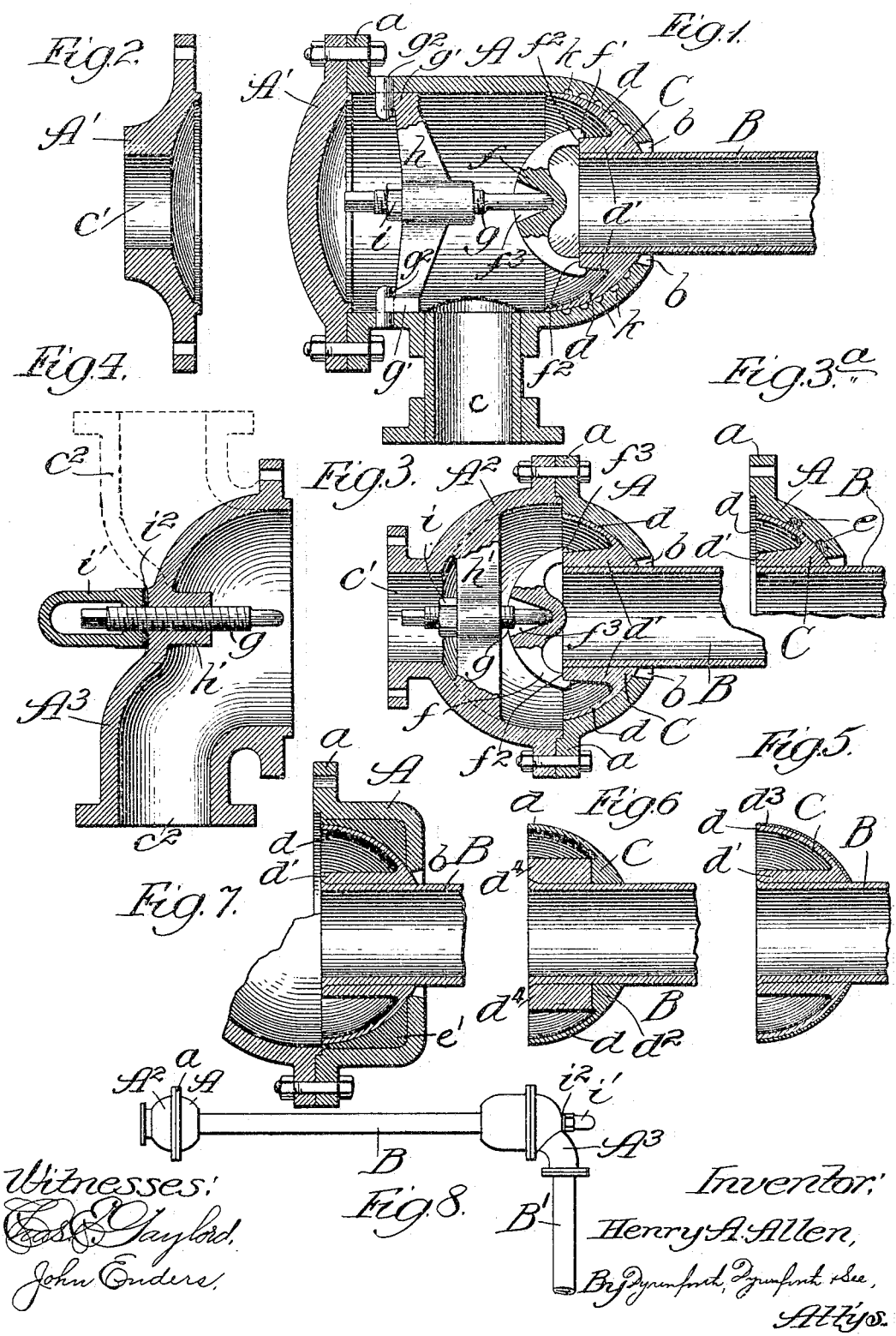

No. 781,862. Patented February 7, 1905.

UNITED STATES PATENT OFFICE.

HENRY A. ALLEN, OF CHICAGO, ILLINOIS.

EXPANSION-JOINT FOR FLUID-PIPES.

SPECIFICATION forming part of Letters Patent No. 781,862, dated February 7, 1905.

Application filed April 4, 1904. Serial No. 201,475.

*To all whom it may concern:*

Be it known that I, HENRY A. ALLEN, a citizen of the United States, residing at Chicago, in the county of Cook and State of Illinois, have invented a new and useful Improvement in Expansion-Joints for Fluid-Pipes, of which the following is a specification.

My invention relates to an improvement in the class of joints used primarily for the purpose of easing strains on piping caused by variation in the temperature of heated fluids passing through the same.

The object of my invention is to provide in the class referred to a novel construction of universal expansion-joint whereby it shall be rendered fluid-tight under all conditions and shall afford, among other incidental advantages, those hereinafter mentioned.

Referring to the accompanying drawings, Figure 1 shows my improved joint by a view in vertical longitudinal section. Fig. 2 is a similar view of a modified form of the cap detail; Fig. 3, a similar view showing a modified construction of the joint; Fig. $3^a$, a similar view of a broken portion of the joint as constructed according to the representation thereof in Fig. 3, but showing a slight modification relative to an inserted relatively soft bearing metal; Fig. 4, a similar view of another modified construction of the cap; Figs. 5 and 6, similar views showing different modifications of the expansible-head feature of my improvement on the end of a pipe to be joined according to the latter; Fig. 7, a similar view showing a further modification in the joint construction, and Fig. 8 a view in elevation of fluid-pipes extending at right angles to each other and equipped with my improvement.

A is the casing, preferably of steel, though it may be of any other suitable metal of sufficient strength to withstand the internal pressure, with the inner surface of one end portion formed or otherwise caused to describe a hollow hemisphere or other section of a sphere. As shown in Fig. 1, the casing is in the form of a cylinder provided at one open end with a circumferential flange $a$ and having its opposite end formed as a portion of a hollow hemisphere with an opening $b$ about its axis and provided between its ends with a lateral flanged opening $c$, which may afford either the discharge or the inlet opening when the opening $b$ would form either the inlet or the discharge opening. For the purposes of the present description the opening $b$ may be regarded as the inlet and the opening $c$ as the outlet.

B is the inlet-pipe extended into the casing through the opening $b$ and carrying therein a bearing-head C, comprising a thimble portion $d'$, which may be cast, shrunk, or otherwise provided about the inner end portion of the pipe to connect it permanently and rigidly therewith, and a bowl portion $d$, extending about the thimble portion with its outer surface describing a portion of a sphere to conform, at least approximately, to the inner surface of the rounded end of the casing, which surfaces should be carefully ground. The bowl portion is formed relatively light to render it flexible, of any suitable metal which will withstand the temperature of the fluid, preferably nickel, though the entire head C may be formed of a less expensive metal—such as iron, steel, bronze, or brass—when the outer surface of the bowl $d$ may be covered with the desired bearing metal, as represented at $d^3$ in Fig. 5—such as nickel, copper, or the like—by electroplating or otherwise. It is also sometimes desirable to have one of the two bearing-surfaces—namely, that of the bowl $d$ or that of the casing—provided with a metal softer than that of the other, thereby more readily to insure tightness of the joint, and to this end such a metal as nickel, Perkins metal, or copper may be let into the inner rounded bearing-surface of the casing in rings $e$, as represented in Fig. $3^a$, or it may be in the form of a filling $e'$, as represented in Fig. 7, in which last-named figure the rounded inner bearing-surface is formed by the filling and the adjacent end of the casing extends at a right angle to the cylindrical portion thereof. In the modification presented in Fig. 6 the thimble portion $d'$ of the head C is formed in two parts, one, $d^4$, of cheaper and stronger metal permanently secured upon the pipe B and the other, $d^2$, forming the thickened base of the bowl, of softer metal, at which it bears against the permanent thimble-section.

The pipe B is introduced into the casing through its open flanged end and is fastened in place by a yoke-brace $f$, straddling the inner end of the pipe and bearing at offsets $f^2$ in its feet $f'$ against the end of the thimble $d'$, the yoke containing a central socket $f^3$, flaring outwardly and having a hemispherical base in which fits the correspondingly-shaped end of a threaded spindle $g$, working in a bearing, shown as a cross-head or girder $h$, extending across the interior of the casing and having, according to the construction represented in Fig. 1, notched feet $g'$ to engage with studs $g^2$, projecting diametrically opposite each other into the casing from its wall. The cross-head is tightened against the studs $g^2$ by turning the stem $g$ at its squared outer end and locking it in its adjusted position with the nut $i$, thereby also tightening the bracket $f$ against the pipe B and pressing the flexible bowl portion of the head C against the corresponding part of the casing. Where the opening $c$ for the attachment of another section of pipe B', Fig. 8, is at an angle to the opening $b$ the flanged cap A' for closing the flanged open end of the casing is imperforate; but when the inlet and outlet openings are to be in line with each other the cap A' may be formed, as represented in Fig. 2, with a central opening $c'$, at which to connect a pipe-section.

The construction represented in Fig. 3 differs from that of Fig. 1 in having the casing A in approximately globular shape, formed of two flanged sections, one section being the cap $A^2$, provided with the opening $c'$ and containing a cross-head $h'$ for the screw $g$ and fastened to the other section. Another construction for the flanged cap for use where the inlet and outlet of the joint are at right angles to each other is that represented at $A^3$ in Fig. 4, having the opening $c^2$ in the direction shown by the full-line representation thereof or in that indicated by dotted lines, or in both. In this form the bearing for the threaded stem $g$ is a lug $h'$, projecting from the inner face of the casting, the outer end of the stem working in a hollow lock-nut $i'$, with a gasket $i^2$ interposed between its inner end and the back of the cap.

As will be understood, one of the universal joints is required at each junction between pipe-sections B and B'. In Fig. 8 a set composed of two of the joints is represented with the pipe-sections extending at a right angle to each other.

The joint may obviously be set with the casing at any angle to the pipes. Before hot fluid is passed through the piping in starting up when the latter is cold and there is no fluid-pressure to hold the parts one to another the brace-and-screw mechanism serve that purpose, and the bowl $d$ may, whenever required, be turned against its seat to grind or finish grinding the joint. When fluid-pressure is admitted into the casing through the piping, it exerts pressure against the concave surface of the bowl, pressing it against and, owing to its flexible nature, causing it to be flexed against and conform accurately to the stationary surface against which it bears in the casing, thereby producing under all conditions of the parts a perfectly fluid-tight joint which is of the nature of a universal or ball-and-socket joint. It is desirable to coat the outer surface of the bowl $d$ with a lubricating medium, preferably graphite in a pulverulent condition, and it is also desirable to provide water-grooves $k$ between the contacting surfaces of the bowl $d$ and the casing, these being shown in Fig. 1 to be provided in the surface of the bowl.

It will be understood that the center of the socket $f^3$ in the brace $f$ coincides with the center of the spherical surfaces.

What I claim as new, and desire to secure by Letters Patent, is—

1. In an expansion-joint for piping, the combination of a casing having an internal bearing-surface describing a section of a hollow sphere with an inlet or outlet opening through it and a similar opening in another part, a pipe projecting into the casing through said first-named opening, and a bowl on said pipe, of metal adequately flexible to adapt it to be flexed, under fluid-pressure exerted upon its concave surface, against said bearing-surface.

2. In an expansion-joint for piping, the combination of a casing having an internal bearing-surface describing a section of a hollow sphere with an inlet or outlet opening through it and a similar opening in another part, a pipe projecting into the casing through said first-named opening, and a bearing-head comprising a thimble on the inner end of said pipe and a bowl extending therefrom, of metal adequately flexible to adapt it to be flexed, under fluid-pressure exerted upon its concave surface, against said bearing-surface.

3. In an expansion-joint for piping, the combination of a casing having an internal bearing-surface describing a section of a hollow sphere with an inlet or outlet opening through it and a similar opening in another part, a pipe projecting into the casing through said first-named opening, and a bearing-head comprising a thimble on the inner end of said pipe and a metal bowl extending therefrom and provided with a covering of relatively soft metal, said covered bowl being of metal adequately flexible to adapt it to be flexed, under fluid-pressure exerted upon its concave surface, against said bearing-surface.

4. In an expansion-joint for piping, the combination of a casing having an internal bearing-surface describing a section of a hollow sphere with an inlet or outlet opening through it and a similar opening in another part, a pipe projecting into the casing through said first-named opening, a bowl on said pipe, of metal adequately flexible to adapt it to be flexed, under fluid-pressure exerted upon its concave surface, against said bearing-surface, and means for confining the bowl against said bearing-surface.

5. In an expansion-joint for piping, the combination of a casing having an internal bearing-surface describing a section of a hollow sphere with an inlet or outlet opening through it and a similar opening in another part, a pipe projecting into the casing through said first-named opening, a bowl on said pipe, of metal adequately flexible to adapt it to be flexed, under fluid-pressure exerted upon its concave surface, against said bearing-surface, a brace engaging said pipe at its inner end and provided with a recess, a screw-stem having one end in said recess-base, and a bearing in which said stem works.

6. In an expansion-joint for piping, the combination of a casing having an internal bearing-surface describing a section of a hollow sphere with an inlet or outlet opening through it and a similar opening in another part, a pipe projecting into the casing through said first-named opening, a bearing-head comprising a thimble on the inner end of said pipe and a bowl extending therefrom, of metal adequately flexible to adapt it to be flexed, under fluid-pressure exerted upon its concave surface, against said bearing-surface, a brace engaging said thimble and provided with a recess having a rounded base, a screw-stem having a rounded end in said recess-base, and a bearing in which said stem works.

7. In an expansion-joint for piping, the combination of a casing having an internal bearing-surface describing a section of a hollow sphere with an inlet or outlet opening through it and a similar opening in another part, a pipe projecting into the casing through said first-named opening, a bearing-head comprising a thimble on the inner end of said pipe and a bowl extending therefrom, of metal adequately flexible to adapt it to be flexed, under fluid-pressure exerted upon its concave surface, against said bearing-surface, a brace engaging said thimble and provided with a recess having a rounded base, a screw-stem having a rounded end in said recess-base, a bearing in which said stem works, and a lock-nut on the stem beyond said bearing.

8. In an expansion-joint for piping, the combination of a casing having an internal bearing-surface describing a section of a hollow sphere with an inlet or outlet opening through it and a similar opening in another part, a pipe projecting into the casing through said first-named opening, a bearing-head comprising a thimble on the inner end of said pipe and a bowl extending therefrom, of metal adequately flexible to adapt it to be flexed, under fluid-pressure exerted upon its concave surface, against said bearing-surface, a brace engaging said thimble and provided with an outwardly-flaring recess having a rounded base, a screw-stem having a rounded end in said recess-base, a cross-head within the casing, in which said stem works, and a lock-nut on the stem beyond said cross-head.

9. In an expansion-joint for piping, the combination of a globular casing formed of two sections with an opening in each, a pipe projecting into the casing through one opening, a bearing-head comprising a thimble on the inner end of said pipe and a bowl extending therefrom and conforming to the inner surface of the respective casing-section, said bowl being composed of metal adequately flexible to adapt it to be flexed, under fluid-pressure exerted upon its concave surface, against said bearing-surface, a brace engaging said thimble and provided with a recess having a rounded end in said recess-base, a cross-head within the casing, in which said stem works, and a lock-nut on the stem beyond said cross-head.

HENRY A. ALLEN.

In presence of—
M. S. MACKENZIE,
WALTER N. WINBERG.